US012754863B2

(12) United States Patent
Agarwal et al.

(10) Patent No.: US 12,754,863 B2
(45) Date of Patent: Oct. 6, 2026

(54) DYNAMIC PRIORITY INVERSION FOR HOST MEMORY BUFFER HANDLING BASED ON A SYSTEM STATE

(71) Applicant: Sandisk Technologies, Inc., Milpitas, CA (US)

(72) Inventors: Dinesh Kumar Agarwal, Bangalore (IN); Amit Sharma, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 17 days.

(21) Appl. No.: 18/943,009

(22) Filed: Nov. 11, 2024

(65) Prior Publication Data

US 2026/0133916 A1 May 14, 2026

(51) Int. Cl.
*G06F 13/16* (2006.01)
*G06F 13/18* (2006.01)

(52) U.S. Cl.
CPC ...... *G06F 13/1673* (2013.01); *G06F 13/1689* (2013.01); *G06F 13/18* (2013.01)

(58) Field of Classification Search
CPC ... G06F 13/1673; G06F 13/1689; G06F 13/18
See application file for complete search history.

(56) References Cited

U.S. PATENT DOCUMENTS 5,752,266 A * 5/1998 Miyawaki ............... G06F 13/18 711/158
6,199,127 B1 * 3/2001 Ajanovic ................ G06F 13/18 711/100
8,135,878 B1 * 3/2012 Jain ......................... G06F 13/28 710/25
10,007,433 B2 6/2018 Hahn
10,712,949 B2 7/2020 Hahn
11,487,660 B2 11/2022 Seok
11,579,805 B2 2/2023 Anandan
11,768,606 B2 9/2023 Segev
2014/0122790 A1 * 5/2014 Lasserre ........... G11C 11/40603 711/E12.001
2016/0026406 A1 * 1/2016 Hahn .................... G06F 3/0685 711/103
2016/0062925 A1 * 3/2016 Surapuram ......... G06F 13/1689 711/158
2022/0012174 A1 * 1/2022 Seok ....................... G06F 3/061
2024/0231698 A1 * 7/2024 Jung ...................... G06F 3/0611
2025/0165183 A1 * 5/2025 Kim ....................... G06F 3/0659

* cited by examiner

*Primary Examiner* — Tracy A Warren
(74) *Attorney, Agent, or Firm* — Arlene P. Neal; NEAL BLIBO LLC

(57) ABSTRACT

A storage device may dynamically adjust priorities for types of data placed on a bus between the storage device and a host to optimize a bus pipeline and maximize the performance on the storage device, while minimizing inefficiencies and latencies on the storage device. A controller on the storage device may access data on a host memory buffer (HMB) and identify different types of data on a bus between the storage device and a host. The controller assigns priorities to the types of data placed on the bus and processes the data on the bus according to an assigned priority. The controller also determines a current system state and adjusts the priorities assigned to the types of data based on the current system state.

20 Claims, 10 Drawing Sheets

DYNAMIC PRIORITY INVERSION FOR HOST MEMORY BUFFER HANDLING BASED ON A SYSTEM STATE

BACKGROUND OF THE INVENTION

A storage device may be communicatively coupled to a host and to non-volatile/persistent memory including, for example, a NAND flash memory device on which the storage device may store data received from the host. The memory device may include multiple dies which may be divided into physical blocks and the storage device may store data in blocks on the memory device. The host may address the data stored in the blocks on the memory device using logical block addresses that may be mapped to physical addresses on the memory device. The logical block address to physical address mappings may be stored in a logical-to-physical (L2P) table stored on the memory device. To enable the storage device to quickly access L2P entries, portions of the L2P table may be cached in a random-access memory (RAM) on the storage device.

The size of the RAM on the storage device used for storing the L2P entries and other control information and for temporarily storing host data before the data is copied to the memory device may be relatively small. To reduce the overhead associated with swapping data into and out of the RAM, the storage device may access a host memory buffer (HMB) (i.e., a volatile memory on the host that may be relatively larger than the RAM on the storage device). The storage device may use the HMB to store control data including, for example, the L2P table and parity information. A controller on the storage device may frequently access the information stored in the HMB.

In some cases, the controller may store relatively small sizes (for example, 4, 16, 32 or 128 bytes (B) of data) of control data on the HMB or retrieve relatively small sizes of control data from the HMB. The retrieval or storage of the relatively small sizes of control data are referred to herein as short HMB accesses. In other cases, the controller may store relatively larger sizes (for example, 4, 16, 32 or 128 kilobytes (KB) of control data on the HMB or retrieve relatively larger sizes of control data from the HMB. The retrieval or storage of the larger sizes of control data are referred to herein as large HMB accesses of HMB Direct Memory Access (DMA).

The storage device may be connected to the host via a Peripheral Component Interconnect Express (PCIe) bus for high-speed data transfer between the host and storage device. As such the PCIe bus may be used for sending host data from the host to the storage device for the data to be stored on the memory device, for sending host data retrieved from the memory device by the storage device to the host, and for enabling the storage device to access the control information stored on the HMB. The host data transmitted between the host and the storage device may be random or sequential data of varying size. Generally, the priority for accessing the PCIe bus and placing data in a PCIe pipeline is predefined. For example, host operations (i.e., host read/write operation) may be given a first (highest) priority, short HMB accesses may be given a second priority, and large HMB accesses may be given a third (lowest) priority. The PCIe bus priority may be followed in both directions, i.e., from the host to the storage device and from the storage device to the host.

In some situations, higher priority data may be dependent on lower priority data. When the PCIe pipeline is congested such that the lower priority data cannot be placed on the bus because of its priority, the lack of access on the bus for the lower priority data may cause a bottleneck because the higher priority data that is already in the pipeline may not be processed without first processing the lower priority data that cannot be placed in the pipeline because of its priority. In these situations, the storage device may experience increased latencies and reduced performance.

SUMMARY OF THE INVENTION

In some implementations, a storage device may dynamically adjust priorities for types of data placed on a bus between the storage device and a host. The storage device may include a memory device to store data. A controller on the storage device may access data on a host memory buffer (HMB) and identify different types of data on a bus between the storage device and a host. The controller assigns priorities to the types of data placed on the bus such that the data on the bus is processed according to an assigned priority. The controller also determines a current system state and adjusts the priorities assigned to the types of data based on the current system state.

In some implementations, a method is provided on the storage device for dynamically adjusting priorities for types of data placed on a bus between the storage device and a host. The method includes accessing data on a HMB and identifying different types of data on a bus between the storage device and a host. The method also includes assigning priorities to the types of data placed on the bus to process the data on the bus is according to an assigned priority. The method further includes determining a current system state; and adjusting the priorities assigned to the types of data based on the current system state.

In some implementations, a method is provided for dynamically adjusting priorities for types of data placed on a bus between the storage device and a host. The method includes accessing data on a HMB and identifying different types of data on a bus between the storage device and a host. The method also includes assigning priorities to the types of data placed on the bus and processing the types of data on the bus in a weighted round robin fashion. The method further includes determining a current system state; and adjusting the priorities assigned to the types of data based on data size, command size, a number of outstanding direct memory accesses for the HMB, and/or the current system state.

Figure 1:
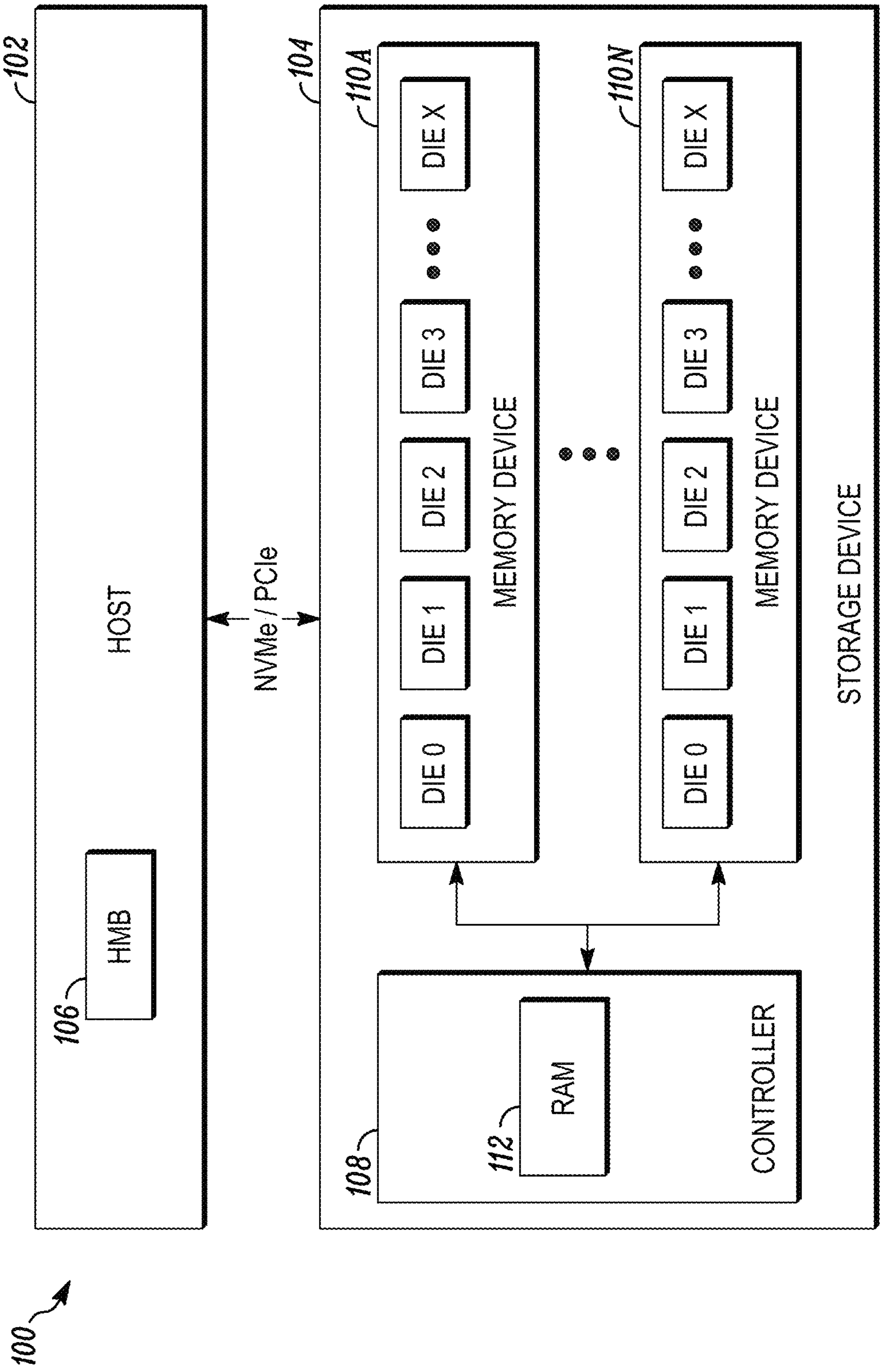
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Host 102 may include a host memory buffer (HMB) 106 that may be used by storage device 104 to store control information such as a L2P table and parity information. Storage device 104 may communicate with host 102 via a Non-Volatile Memory Express (NVMe) protocol over a peripheral component interconnect express (PCIe) bus, and the like. Host 102 may include additional components (not shown in this figure for the sake of simplicity).

Storage device 104 may include a controller 108, one or more non-volatile memory devices 110*a*-110*n* (referred to herein as the memory device(s) 110), and a random-access memory (RAM) 112. Storage device 104 may be, for example, a solid-state drive (SSD). RAM 112 may be, for example, static RAM (SRAM) or dynamic RAM (DRAM) that be used to temporarily store data on storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include multiple dies (for example, DIE 0-DIE X) for storing the data. Memory device 110 may be included in storage device 104 or may be otherwise communicatively coupled to storage device 104.

The PCIe bus between host 102 and storage device 104 may be used for sending host data from host 102 to storage device 104 for the data to be stored on memory device 110, for sending host data retrieved from memory device 110 by the storage device 104 to host 102, and for enabling storage device 104 to access control information stored on HMB 106. The host data may be random data or sequential data of varying sizes. Controller 108 may store relatively small sizes (for example, 4, 16, 32 or 128 bytes (B) of data) of control data on HMB 106 or retrieve relatively small sizes of control data from HMB 106. The retrieval or storage of the relatively small sizes of control data are referred to herein as short HMB accesses. In one example, the controller may execute a short HMB access to retrieve a small number of L2P entries buffered on HMB 106 to execute host read or write operations. Controller 108 may also store relatively larger sizes (for example, 4, 16, 32 or 128 kilobytes (KB) of control data on HMB 106 or retrieve relatively larger sizes of control data from HMB 106. The retrieval or storage of relatively larger sizes of control data are referred to herein as large HMB accesses of HMB Direct Memory Access (DMA). In one example, the controller may execute a HMB DMA to synchronize the entire L2P table buffered on HMB 106.

Each type of data (for example, host data, short HMB accesses, and HMB DMA) placed on a pipeline on the PCIe bus may be assigned a priority. Controller 108 may dynamically adjust the priority for host data, short HMB accesses, and HMB DMA based on a current system state. For example, controller 108 may determine when host data, short HMB accesses, or HMB DMA is needed to maintain performance on storage device 104. Based on the current system state, controller 108 may dynamically adjust the priority for host data, short HMB accesses, and HMB DMA to optimize the PCIe pipeline and maximize the performance on storage device 104, while minimizing inefficiencies and latencies on storage device 104.

Controller 108 may establish periodic synchronization points wherein controller 108 may synchronize/update large portions of the control data buffered on HMB 106. For instance, controller 108 may synchronize the entire L2P table or large portions of the L2P table at a periodic synchronization point. The synchronization of the information in HMB 106 is expected to be completed within a determined time period (referred to herein as a synchronization time period) to maintain the performance of storage device 104. If the time associated with synchronizing the data buffered on HMB 106 exceeds the synchronization time period, a bottleneck may occur, wherein the information on the PCIe pipeline may not be processed efficiently, possibly resulting in latencies on storage device 104.

Consider an example where host data may be assigned a first (highest) priority, short HMB accesses may be assigned a second priority, and HMB DMA may be assigned a third (lowest) priority. If a large amount of host data and/or short HMB accesses is placed on the PCIe bus during a synchronization point such that HMB DMA cannot be performed due to congestion on the PCIe bus, the time associated with synchronizing the data buffered on HMB 106 may exceed the synchronization time period, possibly causing the information on the PCIe bus to be processed inefficiently. While the data on HMB 106 is being synchronized, higher priority data (i.e., pending host read and/or write operations and updates to HMB 106 using short HMB accesses) may be blocked because the higher priority data may be dependent on completion of the HMB DMA. In such cases, the host data and short HMB accesses in the PCIe pipeline may be stuck, possibly causing storage device 104 to enter a low resource mode wherein the performance of storage device 104 may decrease.

When HMB DMA cannot be placed on the PCIe bus due to congestion on the PCIe bus and the priority assigned to the HMB DMA, but the higher priority data in the PCIe pipeline cannot be processed prior to performing the HMB DMA, controller 108 may determine that HMB DMA is needed to maintain the system state and may adjust the priority assigned to HMB DMA. For example, controller 108 may assign a first (highest) priority to HMB DMA, a second priority to host operations, and a third (lowest) priority to short HMB accesses. This may ensure that the HMB DMA may be processed ahead of host operations and short HMB accesses so that the HMB DMA may be completed within the synchronization time period to minimize the DMA timings and consolidate the control data in HMB 106 at a faster speed to free up space and minimize low resource mode timings.

In another example, the PCIe pipeline may include a number of host read/write requests and a number of short HMB access requests such that a control table update or translation delay may not negatively impacted the performance of storage device 104. In this example, if the short HMB accesses are delayed at a synchronization point and processed after the HMB DMA, the performance of storage device 104 may not be negatively impacted. However, if the HMB DMA is blocked or delayed at the synchronization point, the PCIe pipeline may be stalled. To maintain the current/ongoing host transactions, controller 108 may determine that, based on the current system state, the HMB DMA is needed more than the short HMB accesses to maintain the performance of storage device 104. Controller 108 may thus assign, for example, a first (highest) priority to host operations, as second priority to HMB DMA, and a third (lowest) priority to short HMB accesses.

Consider a further example where there is an update to a mset (i.e., a range of entries in the L2P table), the mset in HMB 106 may be stale (out-of-date). When the information on HMB 106 becomes stale, the information on HMB 106 may need to be synchronized prior to processing further transactions using the information on HMB 106. To prevent stalling future operations because of a stale HMB 106 entry, controller 108 may adjust the priority of the short HMB accesses to merge the updated mset with the information in HMB 106. As such, controller 108 may assign, for example, a first (highest) priority to the short HMB accesses, as second priority to host operations, and a third (lowest) priority to the HMB DMA.

In cases where the host data is, for example, sequential and relatively large, controller 108 may execute a balancing approach. In a given window (for example, a given time period), controller 108 may perform a weighted round robin between the host data, the HMB short accesses, and the HMB DMA. The weight assigned to a type of data may be the priority assigned to the type of data. Controller 108 may divide the host data and/or the HMB DMA such that portions of the host data and/or the HMB DMA may be processed in a window in the weighted round robin fashion. The weights assigned to the host data, the HMB short accesses, and the HMB DMA may be dynamically adjusted based on, for example, the size of the host data (for example, whether sequential or random host data is being placed on the PCIe bus), the command sizes, the number of outstanding DMAs needed at HMB 106, and/or a current system state. By dynamically adjusting the PCIe pipeline priority at bus level transactions based on the system state, storage device 104 may achieve an optimal PCIe pipeline, minimize inefficiencies and latencies, and maximize performance.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
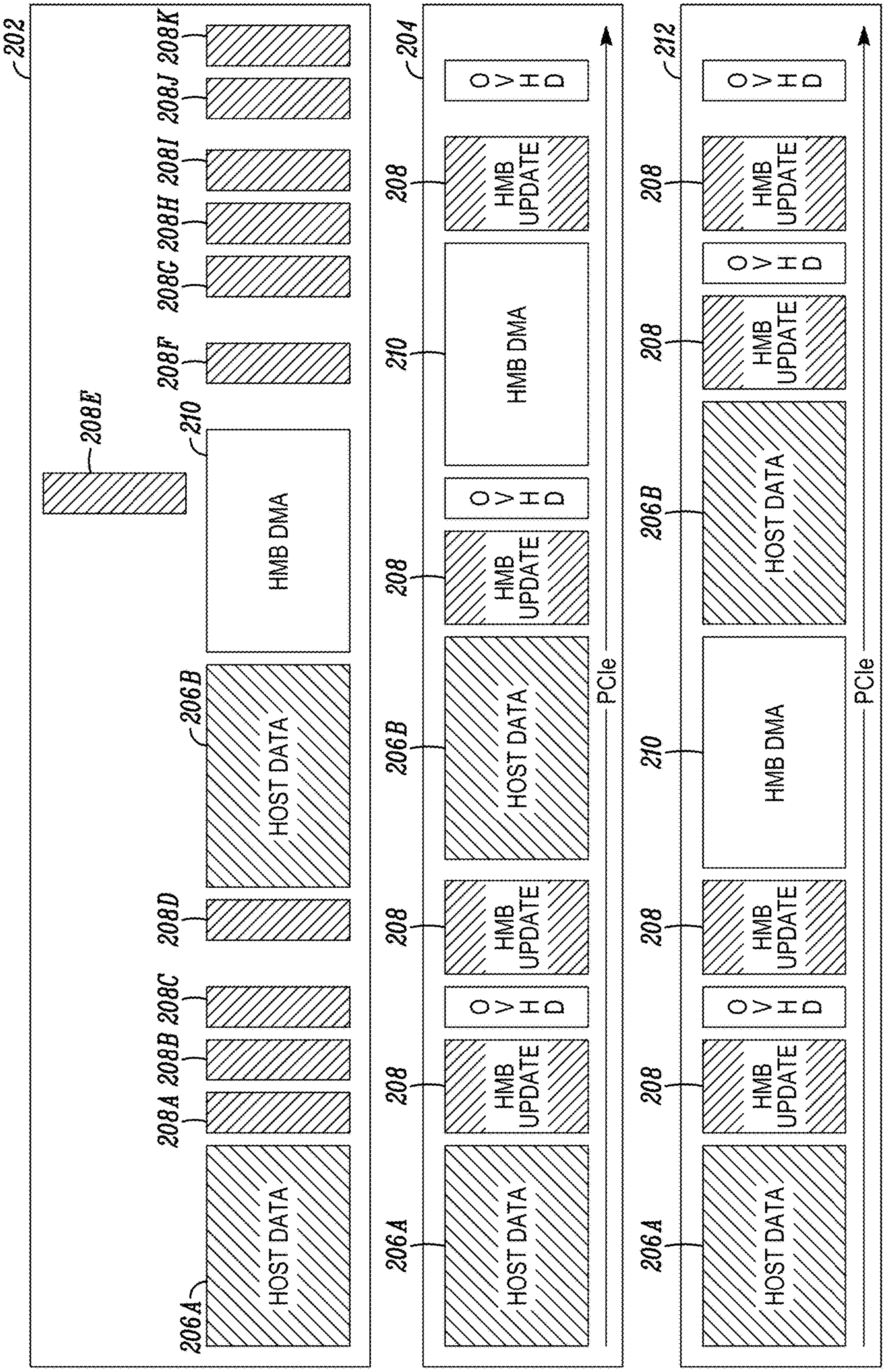
FIG. 2 is an example block diagram showing how priorities assigned to transactions on a PCIe bus may be adjusted based on a system state in accordance with some implementations.

FIG. 2 is an example block diagram showing how priorities assigned to transactions on a PCIe bus may be adjusted based on a system state in accordance with some implementations. 202 shows an example of host data 206*a* and 206*b* (referred to generally as host data 206 and depicted with slanted lines), short HMB accesses 208*a*-208*k* (referred to generally as short HMB accesses 208 and depicted with slanted lines), and HMB DMA 210 as received on a PCIe bus. Host data 206 may be assigned a first (highest) priority, short HMB accesses 208 may be assigned a second priority, and HMB DMA 210 may be assigned a third (lowest) priority. HMB DMA 210 may be sent to the PCIe bus during a synchronization point.

204 shows an example of how host data 206, short HMB access 208, and HMB DMA 210 may be processed on the PCIe bus according to the priorities assigned to host data 206, short HMB access 208, and HMB DMA 210. The pipeline on the PCIe bus may include host data 206*a*, one or more short HMB accesses 208 (shown as HMB update 208), overhead (OVHD), one or more short HMB accesses 208, host data 206*b*, one or more short HMB accesses 208, overhead, HMB DMA 210, one or more short HMB accesses 208, and overhead.

If, for example, host data 206*b* and the short HMB accesses 208 shown after host data 206*b* are being processed during the synchronization point, HMB DMA 210 may not be processed within a synchronization time period due to congestion on the PCIe bus. As such, the time associated with synchronizing the data buffered on HMB 106 may exceed the synchronization time period. While the data on HMB 106 is being synchronized, pending host data 206*b* and short HMB accesses 208 may be blocked because the pending host data 206*b* and short HMB accesses 208 may be dependent on completion of HMB DMA 210.

Controller 108 may determine that HMB DMA 210 is needed to maintain the system state and may adjust the priority assigned to HMB DMA 210. For example, controller 108 may assign a first (highest) priority to HMB DMA 210, a second priority to host data 206, and a third (lowest) priority to short HMB accesses 208. 212 shows an example of how host data 206*b*, short HMB accesses 208 received after host data 206*b*, and HMB DMA 210 may be processed on the PCIe bus according to the adjusted priorities of host data 206, short HMB accesses 208, and HMB DMA 210. As indicated above FIG. 2 is provided as an example. Other examples may differ from what is described in FIG. 2.

Figure 3:
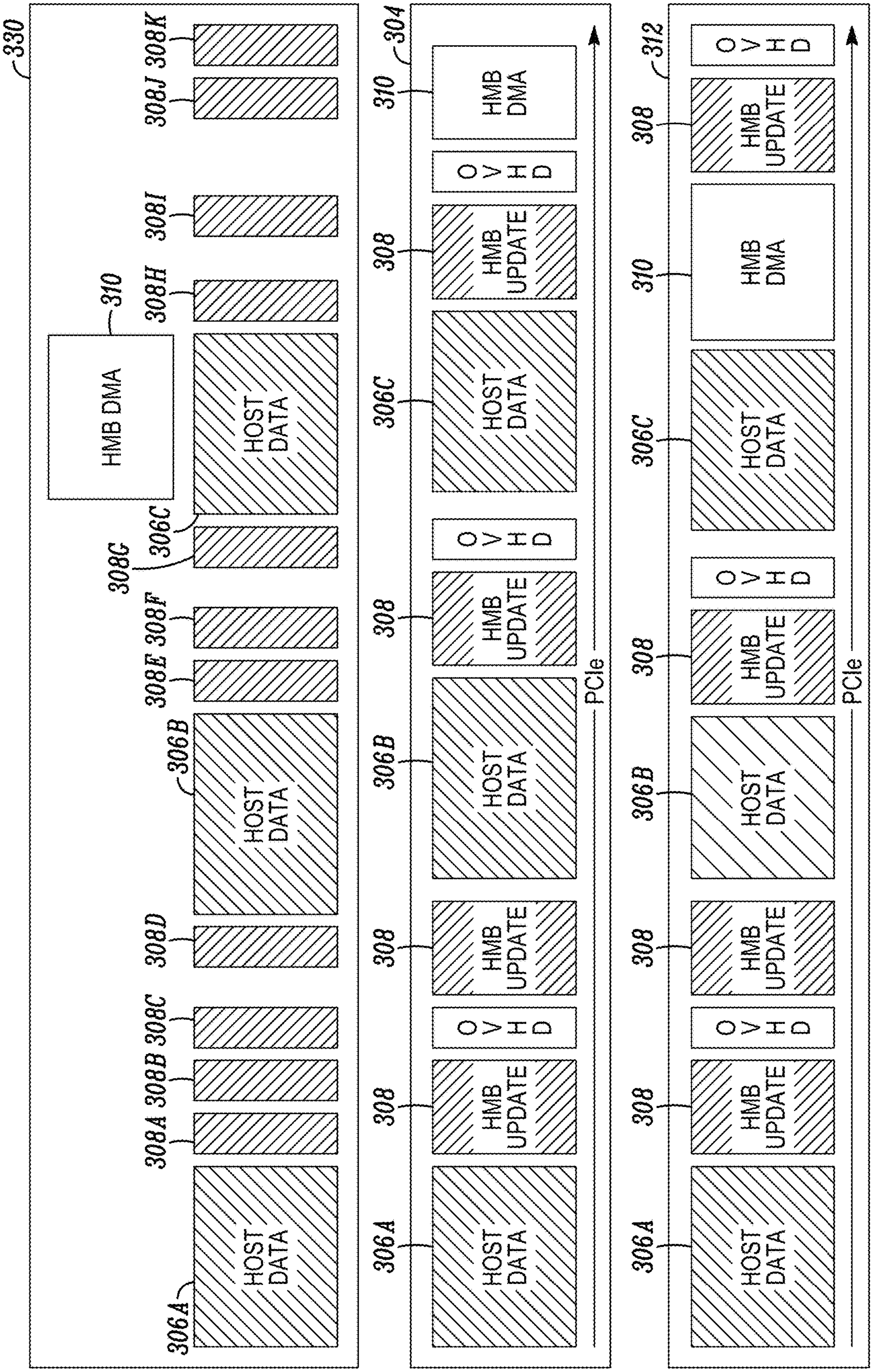
FIG. 3 is another example block diagram showing how priorities assigned to transactions on a PCIe bus may be adjusted based on a system state in accordance with some implementations.

FIG. 3 is another example block diagram showing how priorities assigned to transactions on a PCIe bus may be adjusted based on a system state in accordance with some implementations. 302 shows an example of a number of read/write requests (i.e., host data 306A-C depicted with slanted lines and referred to generally as host data 306), a number of short HMB access requests (i.e., short HMB access 308A-K depicted with slanted lines and referred to generally as short HMB access 308), and HMB DMA 310 received on the PCIe bus. Assuming that host data 306 may be assigned a first (highest) priority, short HMB accesses 308 may be assigned a second priority, and HMB DMA 310 may be assigned a third (lowest) priority, 304 shows an example of how PCIe bus level transactions may be processed according to the assigned priorities.

A control table update or translation delay when the PCIe bus level transactions are processed as shown in 304 may not affect the performance of storage device 104. As such, using the pipeline shown in 304, controller 108 may determine that if the short HMB accesses 308 are delayed and processed after HMB DMA 310, the performance of storage device 104 may not be affected. However, controller 108 may determine that if HMB DMA 310 is blocked/stalled because of its priority, a bottleneck may occur on the PCIe bus. To maintain the current/ongoing host transactions 306, controller 108 may adjust the priorities, based on the current system state, such that HMB DMA 310 may be given a higher priority than the short HMB accesses 308 to maintain the performance of storage device 104. Controller 108 may thus assign, for example, a first (highest) priority to host data 306, a second priority to HMB DMA 310, and a third (lowest) priority to short HMB accesses 308. 312 shows an example of how host data 306, short HMB accesses 308, and HMB DMA 310 may be processed on the PCIe bus according to the adjusted priorities of short HMB accesses 308 and HMB DMA 310. As indicated above FIG. 3 is provided as an example. Other examples may differ from what is described in FIG. 3.

Figure 4:
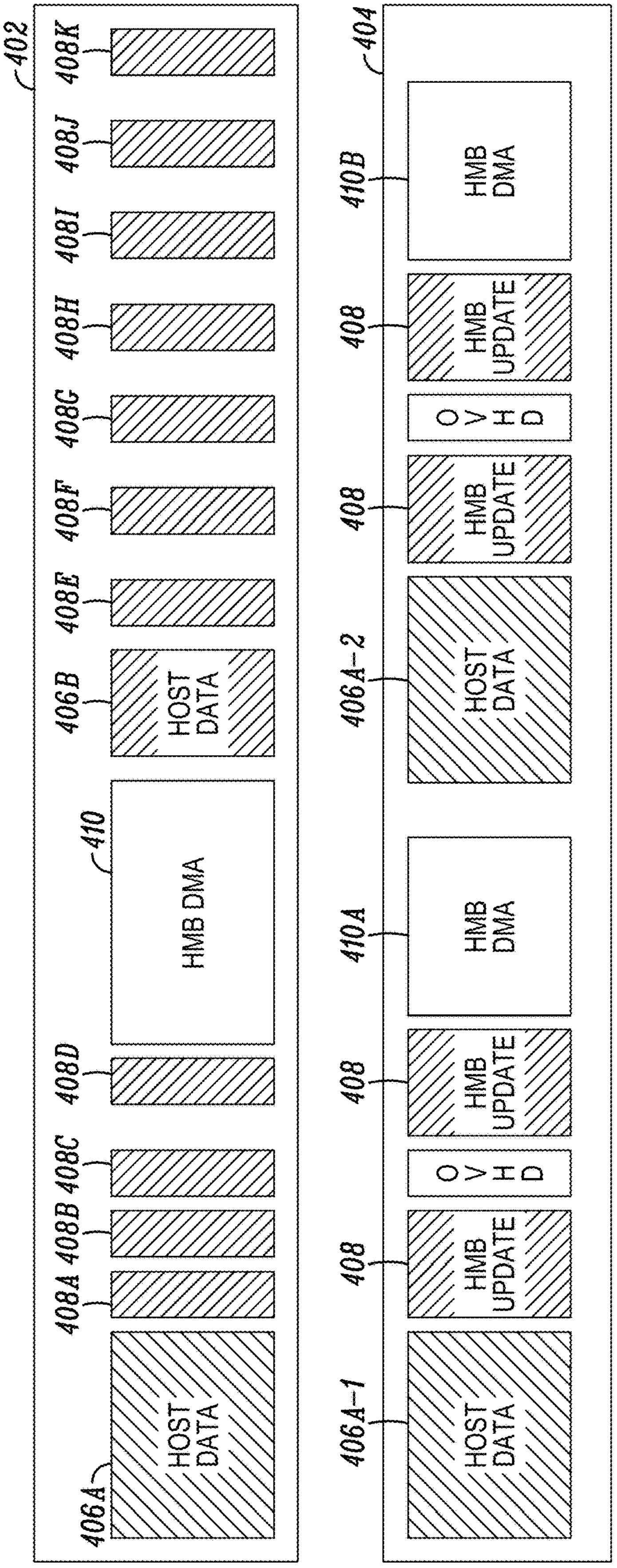
FIG. 4 is another example block diagram showing how priorities assigned to transactions on a PCIe bus may be adjusted based on a system state in accordance with some implementations.

FIG. 4 is another example block diagram showing how priorities assigned to transactions on a PCIe bus may be adjusted based on a system state in accordance with some implementations. Assuming that host data 406 (i.e. host data 406*a* and 406*b* which are generally referred to as host data 406) may be assigned a first (highest) priority, short HMB accesses 408 (i.e. short HMB accesses 408*a*-408*k* which are generally referred to as short HMB accesses 408) may be assigned a second priority, and HMB DMA 410 may be assigned a third (lowest) priority, 402 shows an example how PCIe bus level transactions may be received on the PCIe bus. If, for example, host data 406*a* is sequential and relatively large, controller 108 may execute a balancing approach. In given windows (time frames on the PCIe bus), controller 108 may process host data 406, HMB short accesses 408, and HMB DMA 410 in a weighted round-robin fashion. The weights assigned to host data 406, HMB short accesses 408, and HMB DMA 410 may be dynamically adjusted based on, for example, the size of host data 406 (for example, whether sequential or random host data is being placed on the PCIe bus), the command sizes, the number of outstanding DMAs 410 needed at HMB 106, and/or the current system state.

404 shows how PCIe bus level transactions may be processed according to the adjusted priorities and/or balancing approach. In 404, host data 406*a* may be split into two or more sections (shown as 404*a*-1 and 404*a*-2) and HMB DMA 410 into two or more sections (shown as HMB DMA 410*a* and 410*b*). A first window on the PCIe bus may include the first section of host data 406*a*-1, short HMB accesses 408*a*, overhead, short HMB accesses 408*b*, and a first section of HMB DMA 410*a*. A second window on the PCIe bus may include a second section of host data 406*a*-2, short HMB accesses 408, overhead, short HMB accesses 408*b*, and a second section of HMB DMA 410*b*. As indicated above FIG. 4 is provided as an example. Other examples may differ from what is described in FIG. 4.

Figure 5:
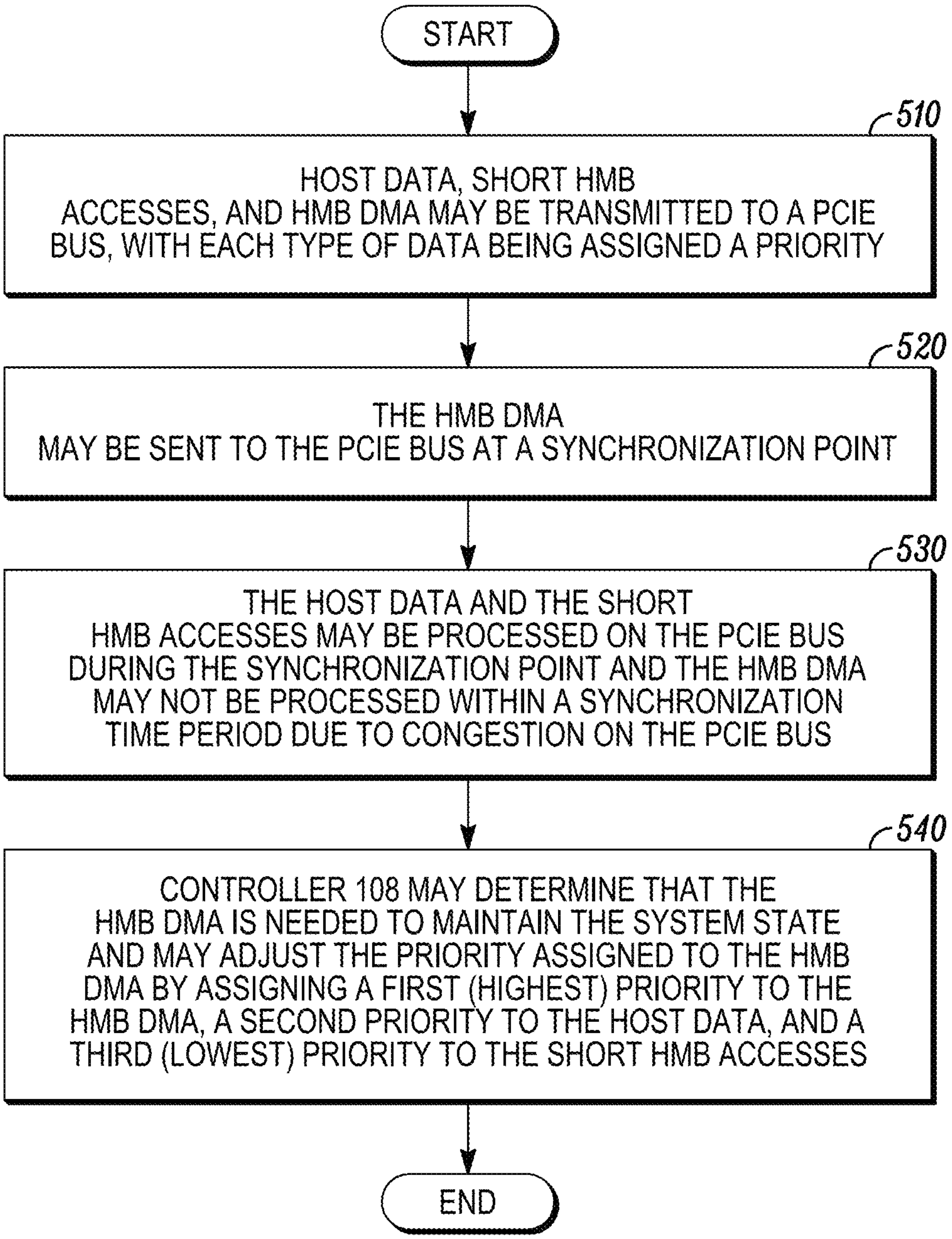
FIG. 5 is an example flow diagram for adjusting priorities assigned to transactions on a PCIe bus based on a system state in accordance with some implementations.

FIG. 5 is an example flow diagram for adjusting priorities assigned to transactions on a PCIe bus based on a system state in accordance with some implementations. At 510, host data, short HMB accesses, and HMB DMA may be transmitted to a PCIe bus, with each type of data being assigned a priority. The host data may be assigned a first (highest) priority, short HMB accesses may be assigned a second priority, and the HMB DMA may be assigned a third (lowest) priority. At 520, the HMB DMA may be sent to the PCIe bus at a synchronization point. At 530, the host data and the short HMB accesses may be processed on the PCIe bus during the synchronization point and the HMB DMA may not be processed within a synchronization time period due to congestion on the PCIe bus. At 540, controller 108 may determine that the HMB DMA is needed to maintain the system state and may adjust the priority assigned to the HMB DMA by assigning a first (highest) priority to the HMB DMA, a second priority to the host data, and a third (lowest) priority to the short HMB accesses. As indicated above FIG. 5 is provided as an example. Other examples may differ from what is described in FIG. 5.

Figure 6:
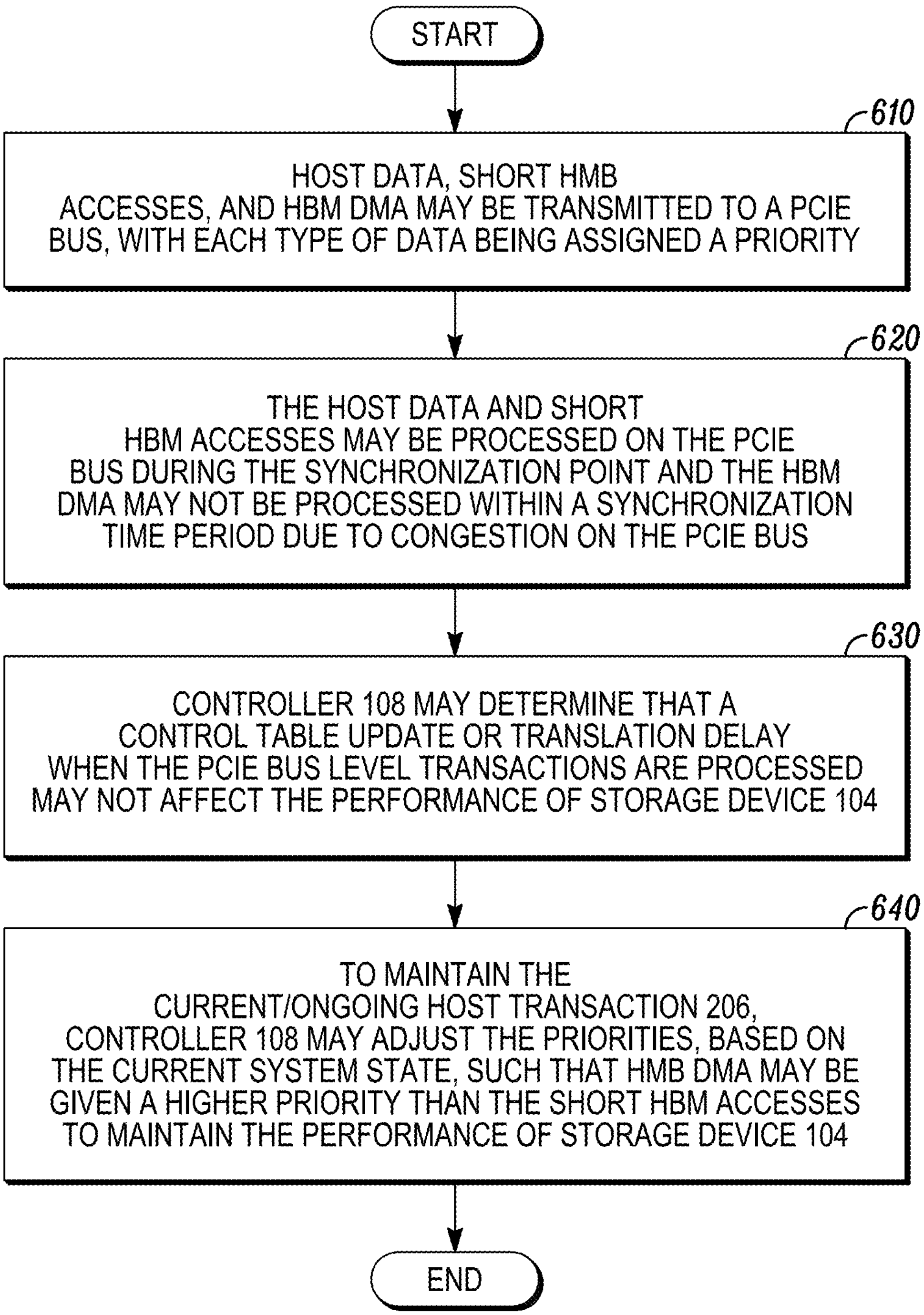
FIG. 6 is another example flow diagram for adjusting priorities assigned to transactions on a PCIe bus based on a system state in accordance with some implementations.

FIG. 6 is another example flow diagram for adjusting priorities assigned to transactions on a PCIe bus based on a system state in accordance with some implementations. At 610, host data, short HMB accesses, and HMB DMA may be transmitted to a PCIe bus, with each type of data being assigned a priority. The host data may be assigned a first (highest) priority, short HMB accesses may be assigned a second priority, and the HMB DMA may be assigned a third (lowest) priority. At 620, the host data and short HMB accesses may be processed on the PCIe bus during the synchronization point and the HMB DMA may not be processed within a synchronization time period due to congestion on the PCIe bus. At 630, controller 108 may determine that a control table update or translation delay when the PCIe bus level transactions are processed may not affect the performance of storage device 104. At 640, to maintain the current/ongoing host transaction 206, controller 108 may adjust the priorities, based on the current system state, such that HMB DMA may be given a higher priority than the short HMB accesses to maintain the performance of storage device 104. Controller 108 may thus assign, for example, a first (highest) priority to host data, as second priority to HMB DMA, and a third (lowest) priority to short HMB accesses. As indicated above FIG. 6 is provided as an example. Other examples may differ from what is described in FIG. 6.

Figure 7:
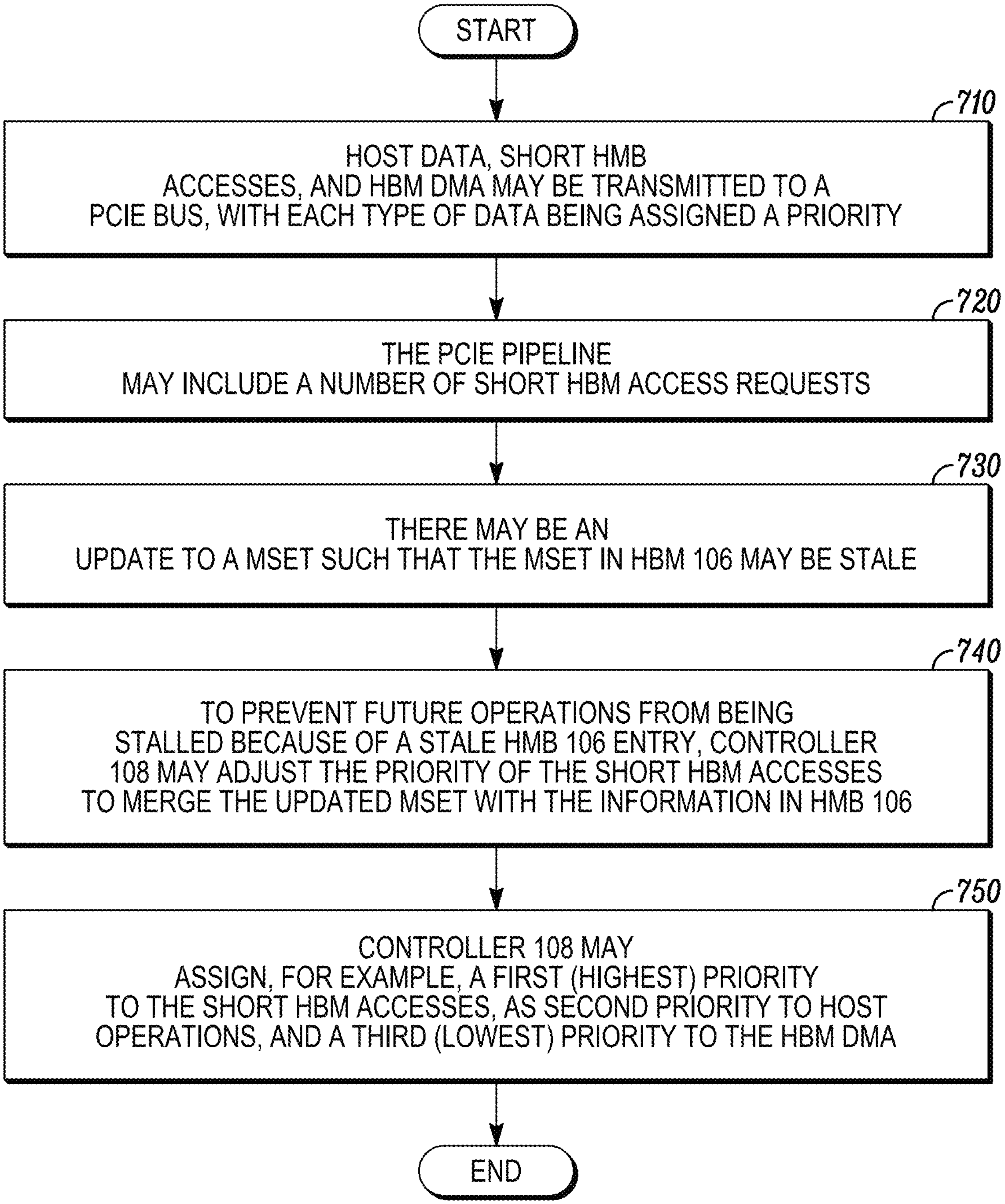
FIG. 7 is another example flow diagram for adjusting priorities assigned to transactions on a PCIe bus based on a system state in accordance with some implementations.

FIG. 7 is another example flow diagram for adjusting priorities assigned to transactions on a PCIe bus based on a system state in accordance with some implementations. At 710, host data, short HMB accesses, and HMB DMA may be transmitted to a PCIe bus, with each type of data being assigned a priority. The host data may be assigned a first (highest) priority, short HMB accesses may be assigned a second priority, and HMB DMA 210 may be assigned a third (lowest) priority. At 720, the PCIe pipeline may include a number of short HMB access requests. At 730, there may be an update to a mset such that the mset in HMB 106 may be stale. At 740, to prevent future operations from being stalled because of a stale HMB 106 entry, controller 108 may adjust the priority of the short HMB accesses to merge the updated mset with the information in HMB 106. At 750, controller 108 may assign, for example, a first (highest) priority to the short HMB accesses, as second priority to host operations, and a third (lowest) priority to the HMB DMA. As indicated above FIG. 7 is provided as an example. Other examples may differ from what is described in FIG. 7.

Figure 8:
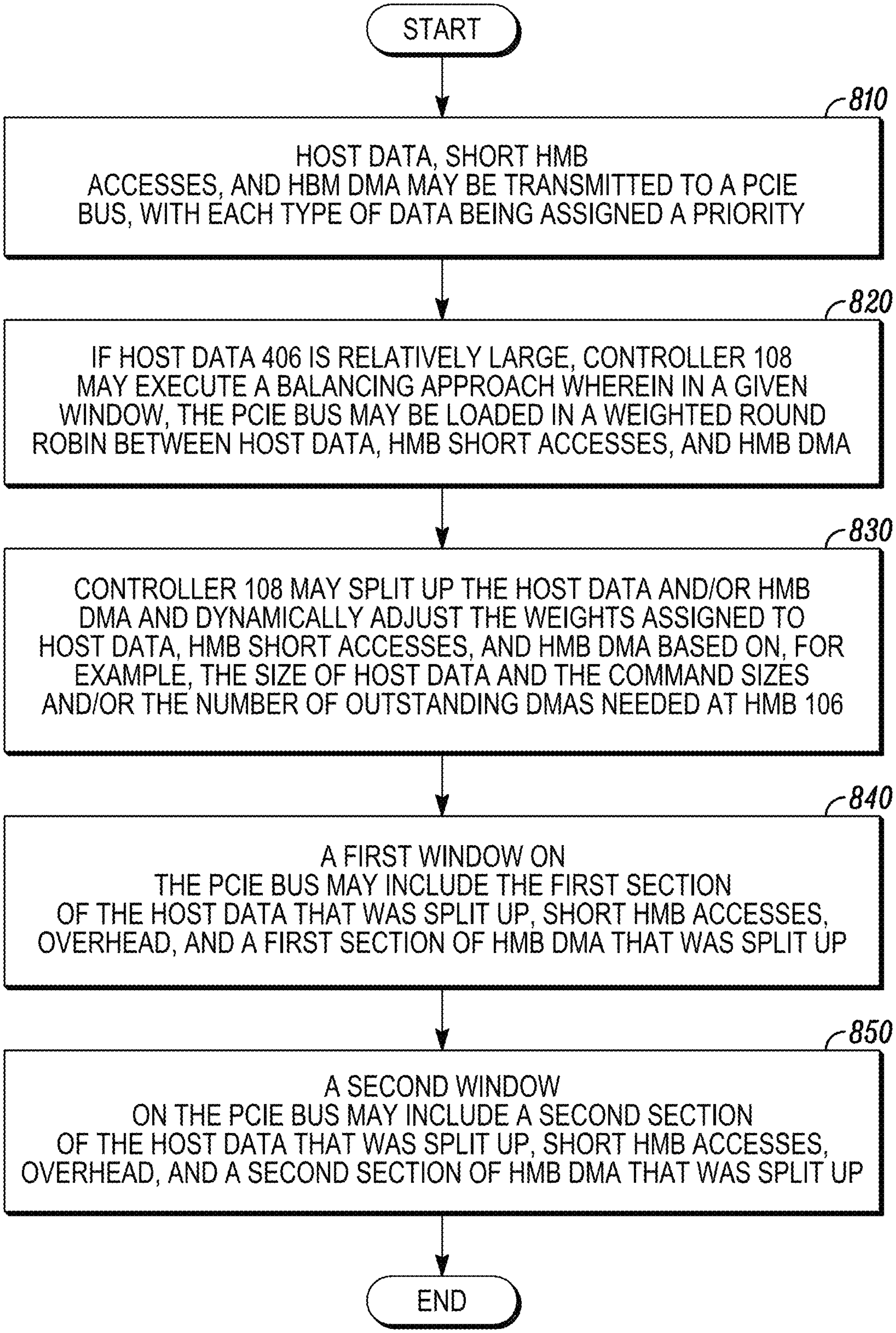
FIG. 8 is another example flow diagram for adjusting priorities assigned to transactions on a PCIe bus based on a system state in accordance with some implementations.

FIG. 8 is another example flow diagram for adjusting priorities assigned to transactions on a PCIe bus based on a system state in accordance with some implementations. At 810, host data, short HMB accesses, and HMB DMA may be transmitted to a PCIe bus, with each type of data being assigned a priority. The host data may be assigned a first (highest) priority, short HMB accesses may be assigned a second priority, and the HMB DMA may be assigned a third (lowest) priority. At 820, if host data 406 is relatively large, controller 108 may execute a balancing approach wherein in a given window, the PCIe bus may be loaded in a weighted round robin between host data, HMB short accesses, and HMB DMA. At 830, controller 108 may split up the host data and/or HMB DMA and dynamically adjust the weights assigned to host data, HMB short accesses, and HMB DMA based on, for example, the size of host data and the command sizes and the number of outstanding DMAs needed at HMB 106. At 840, a first window on the PCIe bus may include the first section of the host data that was split up, short HMB accesses, overhead, and a first section of HMB DMA that was split up. At 840, a second window on the PCIe bus may include a second section of the host data that was split up, short HMB accesses, overhead, and a second section of HMB DMA that was split up. As indicated above FIG. 8 is provided as an example. Other examples may differ from what is described in FIG. 8.

Figure 9:
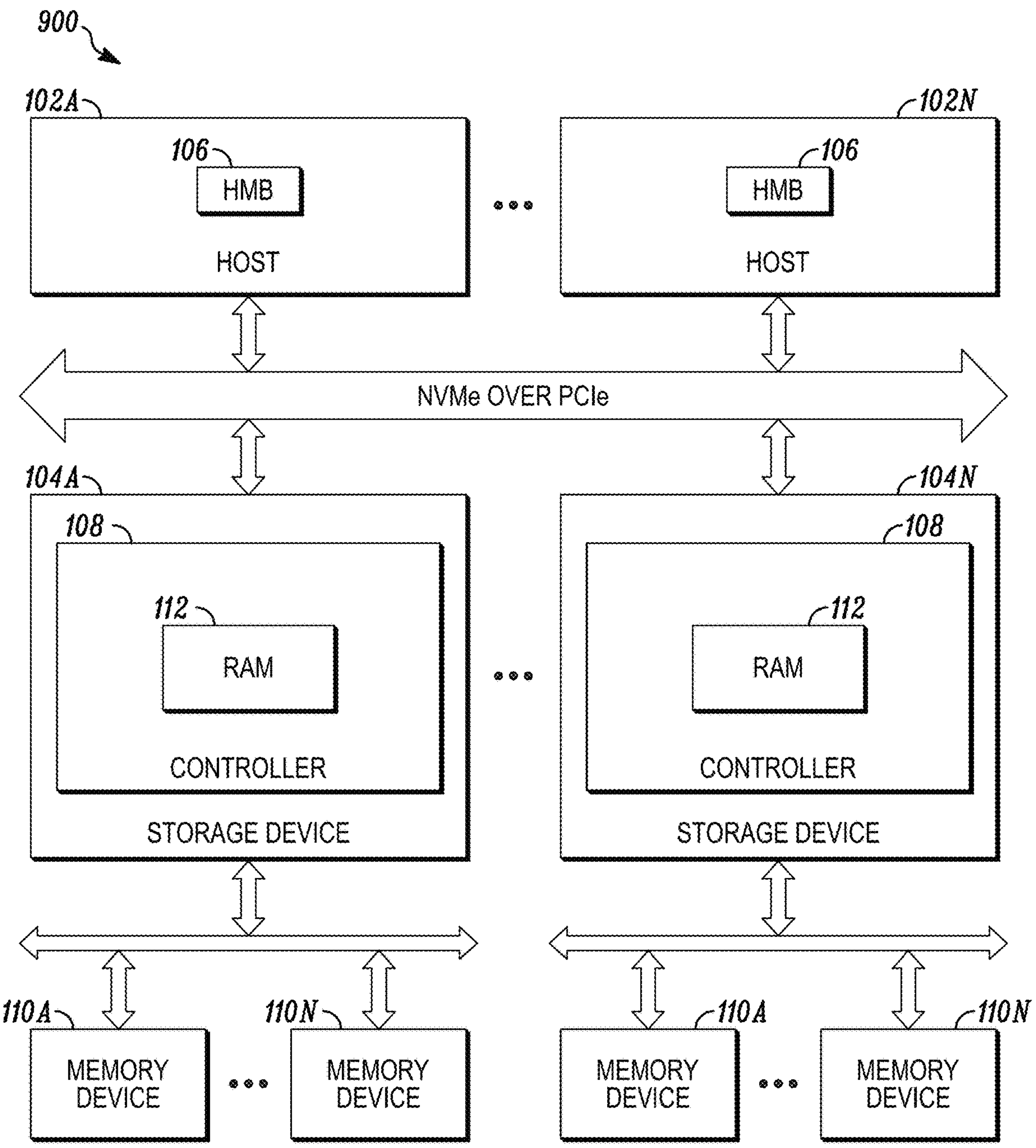
FIG. 9 is a diagram of an example environment in which systems and/or methods described herein are implemented.

FIG. 9 is a diagram of an example environment in which systems and/or methods described herein are implemented. As shown in FIG. 9, Environment 900 may include hosts 102-102*n* (referred to herein as host(s) 102), and one or more storage devices 104*a*-104*n* (referred to herein as storage device(s) 104). Storage device 104 may dynamically adjust the priorities of types of data placed on a PCIe bus between host 102 and storage device 104 based on a system state. Hosts 102 and storage devices 104 may communicate via Non-Volatile Memory Express (NVMe) over peripheral component interconnect express (PCI Express or PCIe), SD, or the like.

Devices of Environment 900 may interconnect via wired connections, wireless connections, or a combination of wired and wireless connections. For example, the network in FIG. 9 may include NVMe over Fabric (NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of Environment 900 may perform one or more functions described as being performed by another set of devices of Environment 900.

Figure 10:
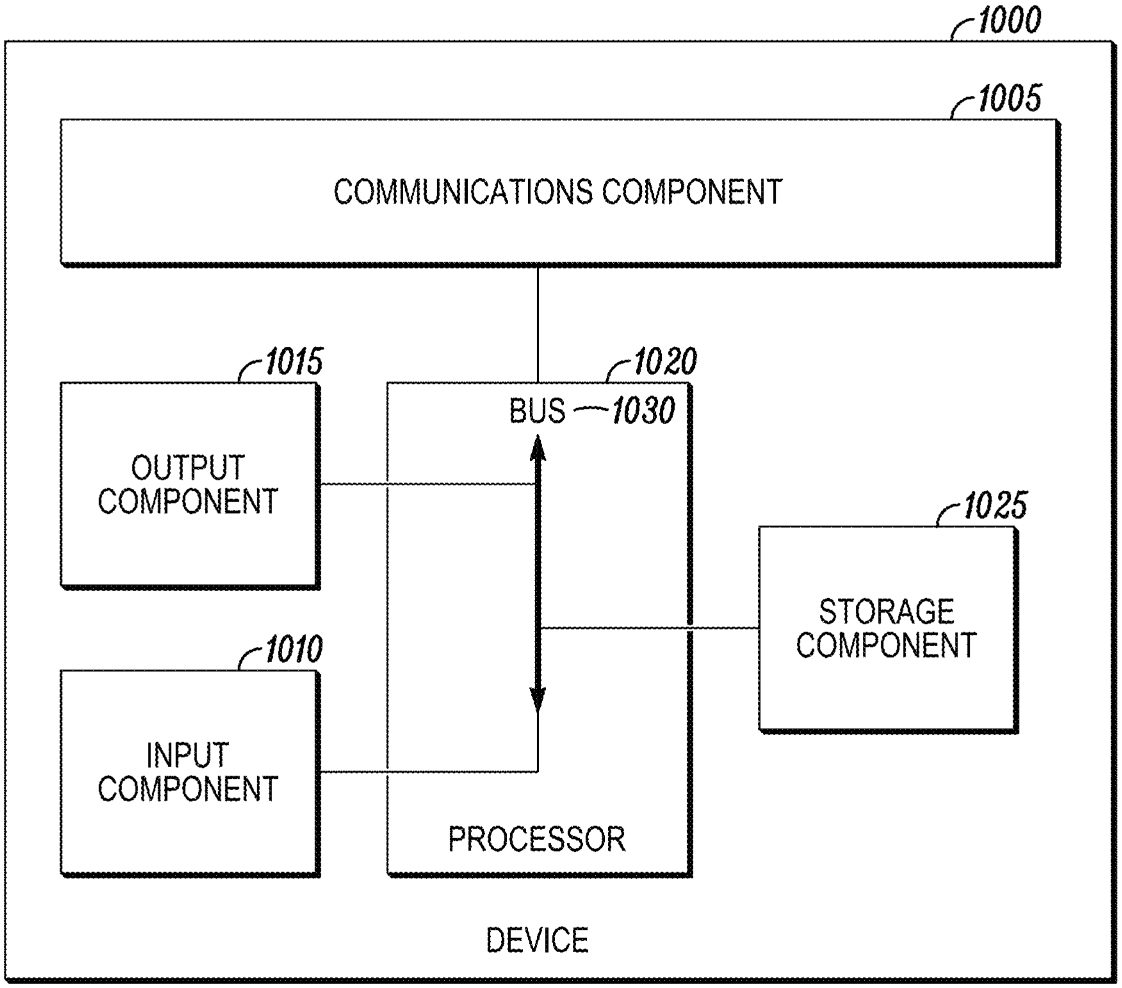
FIG. 10 is a diagram of example components of one or more devices of FIG. 1.

FIG. 10 is a diagram of example components of one or more devices of FIG. 1. In some implementations, host 102 may include one or more devices 1000 and/or one or more components of device 1000. Device 1000 may include, for example, a communications component 1005, an input component 1010, an output component 1015, a processor 1020, a storage component 1025, and a bus 1030. Bus 1030 may include components that enable communication among multiple components of device 1000, wherein components of device 1000 may be coupled to be in communication with other components of device 1000 via bus 1030.

Input component 1010 may include components that permit device 1000 to receive information via user input (e.g., keypad, a keyboard, a mouse, a pointing device, and a network/data connection port, or the like), and/or components that permit device 1000 to determine the location or other sensor information (e.g., an accelerometer, a gyroscope, an actuator, another type of positional or environmental sensor). Output component 1015 may include components that provide output information from device 1000 (e.g., a speaker, display screen, and network/data connection port, or the like). Input component 1010 and output component 1015 may also be coupled to be in communication with processor 1020.

Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 may include one or more processors capable of being programmed to perform a function. Processor 1020 may be implemented in hardware, firmware, and/or a combination of hardware and software.

Storage component 1025 may include one or more memory devices, such as random-access memory (RAM 112), read-only memory (ROM), and/or another type of dynamic or static storage device (e.g., a flash memory, a magnetic memory, and/or optical memory) that stores information and/or instructions for use by processor 1020. A memory device may include memory space within a single physical storage device or memory space spread across multiple physical storage devices. Storage component 1025 may also store information and/or software related to the operation and use of device 1000. For example, storage component 1025 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 1005 may include a transceiver-like component that enables device 1000 to communicate with other devices, such as via a wired connection, a wireless connection, or a combination of wired and wireless connections. The communications component 1005 may permit device 1000 to receive information from another device and/or provide information to another device. For example, communications component 1005 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 1005 may also include one or more broadband and/or narrowband transceivers and/or other similar types of wireless transceiver configurable to communicate via a wireless network for infrastructure communications. Communications component 1005 may also include one or more local area network or personal area network transceivers, such as a Wi-Fi transceiver or a Bluetooth transceiver.

Device 1000 may perform one or more processes described herein. For example, device 1000 may perform these processes based on processor 1020 executing software instructions stored by a non-transitory computer-readable medium, such as storage component 1025. As used herein, the term "computer-readable medium" refers to a non-transitory memory device. Software instructions may be read into storage component 1025 from another computer-readable medium or from another device via communications component 1005. When executed, software instructions stored in storage component 1025 may cause processor 1020 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to dynamically adjust priorities for types of data placed on a bus between the storage device and a host, the storage device comprises:

a memory device to store data; and a controller to store control data on a host memory buffer (HMB) and to access the control data stored on the HMB, wherein the control data is sent between the host and the storage device via the bus between the host and the storage device, identify different types of data on the bus between the storage device and the host, assign priorities to the types of data placed on the bus based on data types, wherein a different priority is assigned to each data type, process the data on the bus according to an assigned priority, determine a current system state, and adjust the priorities assigned to the types of data based on the current system state.

2. The storage device of claim 1, wherein the different types of data include host data, a first number of control data, and a second number of control data, wherein the first number of control data is smaller in size than the second number of control data, wherein at an initial period, the host data is assigned a first priority, the first number of control data is assigned a second priority and the second number of control data is assigned a third priority.

3. The storage device of claim 1, wherein when the controller determines the current system state, the controller determines when a type of data is to be processed to maintain performance on the storage device.

4. The storage device of claim 1, wherein the controller establishes a synchronization point wherein control data stored on the HMB is to be updated within a synchronization time period.

5. The storage device of claim 1, wherein the controller determines when one of storage and retrieval for a second number of control data cannot be performed within a synchronization time period due to congestion on the bus and assigns the second number of control data a higher priority than other types of data on the bus.

6. The storage device of claim 5, wherein the controller assigns a first priority to the second number of control data, a second priority to host operations, and a third priority to a first number of control data.

7. The storage device of claim 1, wherein when the controller determines the current system state, the controller determines when the bus includes host requests and one of storage and retrieval for a first number of control data wherein if one of storage and retrieval of the first number of control data is delayed, performance of the storage device is not negatively impacted but if one of storage and retrieval for a second number of control data is not processed within a synchronization time period, the performance of the storage device is negatively impacted.

8. The storage device of claim 7, wherein the controller assigns a first priority to host operations, a second priority to the second number of control data, and a third priority to the first number of control data.

9. The storage device of claim 1, wherein when the controller determines the current system state, the controller determines when a range of entries in a logical-to-physical table in the HMB is out-of-date.

10. The storage device of claim 9, wherein the controller assigns a first priority to one of storage and retrieval for a first number of control data, a second priority to host operations, and a third priority to a one of storage and retrieval for second number of control data.

11. A method on a storage device for dynamically adjusting priorities for types of data placed on a bus between the storage device and a host, the storage device comprises a controller to execute the method comprising:

storing control data on a host memory buffer (HMB) and accessing control data stored on the (HMB), wherein the control data is sent between the host and the storage device via the bus between the host and the storage device;

identifying different types of data on the bus between the storage device and the host;

assigning priorities to the types of data placed on the bus based on data types, wherein a different priority is assigned to each data type;

processing the data on the bus according to an assigned priority;

determining a current system state; and adjusting the priorities assigned to the types of data based on the current system state.

12. The method of claim 11, wherein the determining the current system state comprises determining when a type of data is to be processed to maintain performance on the storage device.

13. The method of claim 11, further comprising establishing a synchronization point wherein control data stored on the HMB is to be updated within a synchronization time period.

14. The method of claim 11, wherein determining the current system state comprises determining when one of storage and retrieval of a second number of control data cannot be performed within a synchronization time period due to congestion on the bus.

15. The method of claim 14, further comprising assigning a first priority to one of storage and retrieval for the second number of control data, a second priority to host operations, and a third priority to one of storage and retrieval for a first number of control data.

16. The method of claim 11, wherein determining the current system state comprises determining when the bus includes host requests and one of storage and retrieval for a first number of control data such that if one of storage and retrieval for the first number of control data are delayed, performance of the storage device is not negatively impacted but if one of storage and retrieval for a second number of control data is not processed within a synchronization time period, the performance of the storage device is negatively impacted.

17. The method of claim 16, further comprising assigning a first priority to host operations, a second priority to one of storage and retrieval for the second number of control data, and a third priority to one of storage and retrieval for the first number of control data.

18. The method of claim 11, wherein determining the current system state comprises determining when a range of entries in a logical-to-physical table in the HMB is out-of-date.

19. The method of claim 18, further comprising assigning a first priority to one of storage and retrieval for a first number of control data, a second priority to host operations, and a third priority to one of storage and retrieval for a second number of control data.

20. A method on a storage device for dynamically adjusting priorities for types of data placed on a bus between the storage device and a host, the storage device comprises a controller to execute the method comprising:

storing control data on a host memory buffer (HMB) and accessing control data on the HMB, wherein the control data is sent between the host and the storage device via the bus between the host and the storage device;

identifying different types of data on the bus between the storage device and the host;

assigning priorities to the types of data placed on the bus based on data types, wherein a different priority is assigned to each data type;

processing the types of data on the bus in a weighted round robin fashion;

determining a current system state; and adjusting the priorities assigned to the types of data based on at least one of data size, command size, a number of outstanding direct memory accesses for the HMB, and the current system state.

* * * * *